(12) United States Patent
Krishnamurthy (10) Patent No.: US 8,914,731 B2
(45) Date of Patent: Dec. 16, 2014

(54) ANALYZING USER BEHAVIOR TO ENHANCE DATA DISPLAY

(75) Inventor: Sanjay Krishnamurthy, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 755 days.

(21) Appl. No.: 12/414,983

(22) Filed: Mar. 31, 2009

(65) Prior Publication Data

US 2010/0251126 A1    Sep. 30, 2010

(51) Int. Cl.
G06F 3/048 (2013.01)
G06F 9/455 (2006.01)
G06F 17/30 (2006.01)

(52) U.S. Cl.
CPC ...... G06F 17/30522 (2013.01); G06F 9/45512 (2013.01)
USPC ............ 715/744; 715/745; 715/789; 715/811

(58) Field of Classification Search
CPC .. G06F 3/048; G06F 3/30484; G06F 3/30481
USPC .................. 715/734, 735, 744, 745, 789, 811
See application file for complete search history.

(56) References Cited

U.S. PATENT DOCUMENTS

| | | |
|---|---|---|
| 6,427,147 B1 | 7/2002 | Marquis |
| 6,480,857 B1 | 11/2002 | Chandler |
| 6,694,323 B2 | 2/2004 | Bumbulis |
| 6,779,119 B1 * | 8/2004 | Moshfeghi et al. ............. 726/23 |
| 2003/0160815 A1 * | 8/2003 | Muschetto .................... 345/733 |
| 2004/0243553 A1 | 12/2004 | Bailey |
| 2007/0006165 A1 * | 1/2007 | Lam et al. ..................... 717/128 |
| 2007/0088764 A1 * | 4/2007 | Yoon et al. .................... 707/201 |
| 2007/0240183 A1 * | 10/2007 | Garbow et al. ................. 725/38 |
| 2009/0088204 A1 | 4/2009 | Culbert et al. |
| 2009/0100384 A1 | 4/2009 | Louch |
| 2009/0150814 A1 * | 6/2009 | Eyer et al. .................... 715/765 |

OTHER PUBLICATIONS

Grust, T. et al. Accelerating XPath Evaluation in Any RDBMS, Mar. 2004, ACM Transactions on Database Systems, vol. 29, No. 1, pp. 91-131.

Yuen, L. et al. "Relational Index Support for XPath Axes", 2005, International XML Database Symposium, pp. 84-98.

(Continued)

*Primary Examiner* — Omar Abdul-Ali
*Assistant Examiner* — Phuong Nguyen
(74) *Attorney, Agent, or Firm* — Omkar K. Suryadevara; Silicon Valley Patent Group LLP (57) ABSTRACT

A method and apparatus for enhancing the display of data is provided. User interaction data describing the interactions of a plurality of users with a user interface component is stored. The user interaction data is analyzed to identify patterns of prior use of the user interface component. The operation of a three-tier architecture may be configured to enhance performance based on the patterns of prior use. For example, upon determining a certain percentage of users interact with the user interface component in a manner requiring the visual appearance of the user interface component to be updated to depict additional data not previously depicted, the additional data may be cached at an application tier or provided to a client before a user requests the additional data to minimize the delay in retrieving the additional data. The patterns of prior use may also be used to selectively initialize resources at the middle-tier.

12 Claims, 5 Drawing Sheets

(56) References Cited

OTHER PUBLICATIONS

O'Connor, M.F. et al. "An Extended Preorder Index for Optimising XPath Expressions", 2005, International XML Database Symposium, pp. 114-128.

Hanson, E.N. "Rule Condition Testing and Action Execution in Ariel", ACM SIGMOD, 1992, pp. 49-58.

Office Action dated Apr. 22, 2011 in U.S. Appl. No. 12/415,440, pp. 16.

Amendment dated Jul. 22, 2011 in U.S. Appl. No. 12/415,440, pp. 12.

Interview Summary dated Jul. 26, 2011 in U.S. Appl. No. 12/415,440, pp. 3.

Final Office Action dated Sep. 20, 2011 in U.S. Appl. No. 12/415,440, pp. 21.

Amendment dated Dec. 20, 2011 in U.S. Appl. No. 12/415,440, pp. 13.

Interview Summary dated Dec. 28, 2011 in U.S. Appl. No. 12/415,440, pp. 3.

U.S. Appl. No. 12/415,440, 45 pages.

Notice of Allowance dated Apr. 12, 2012 in U.S. Appl. No. 12/415,440, pp. 25.

* cited by examiner

Flow Trace — Mozilla Firefox http://sdchs401019.siebel.com:8888/SOAConsole/faces/_ADFxDlg_?_adf.winId=169515934_4&_adf.ctrl-state=169515934_6&ipMsgID=5aca5d588_w  — 410

Flow Trace ⓘ
This page shows the flow of the message through various composite and component instances Data Refreshed 15-Sep-08 12:36:52 MDT {http://schemas.oracle.com/bpel/extension}remoteFault    ⊠ System    11-Sep-08 18:14:50 IDecompositionProcesDecompOBRProcess:DecompApp2    ECID 0000HlJuEmX0000000000000010hQDI000000009k:46105822 — 430

Trace
Click on a component instance to see its detailed audit trail — 440
Show Instance IDs ☐

— 420, 450

| Instance | Type | Status | Time |
|---|---|---|---|
| ⊟ @client | Service | Completed Successfully | 11-Sep-08 18:14:46 MDT |
| ⊟ ⨳ OCToDecomp | BPEL Component | Completed Successfully | 11-Sep-08 18:14:47 MDT |
| @OrderCaptureAMService | Reference | Completed Successfully | 11-Sep-08 18:14:46 MDT |
| ⊟ @Decomp | Reference | Completed Successfully | 11-Sep-08 18:14:47 MDT |
| @client | Service | Completed Successfully | 11-Sep-08 18:14:47 MDT |
| @DooPIMServicesAMService | Reference | Completed Successfully | 11-Sep-08 18:14:47 MDT |
| @OrchestrationCRUDServices | Reference | Completed Successfully | 11-Sep-08 18:14:48 MDT |
| @OrchestrationCRUDServices | Reference | Completed Successfully | 11-Sep-08 18:14:49 MDT |
| @OrchestrationCRUDServices | Reference | Completed Successfully | 11-Sep-08 18:14:49 MDT |
| ⊟ ⨳ DecompositionProcess ⊠ | BPEL Component | Faulted | 11-Sep-08 18:14:50 MDT |
| @DooPIMServicesAMService | Reference | Completed Successfully | 11-Sep-08 18:14:47 MDT |
| @OracleRules2 | Decision Service Compon | Completed Successfully | 11-Sep-08 18:14:47 MDT |
| @OrchestrationCRUDServices | Reference | Completed Successfully | 11-Sep-08 18:14:47 MDT |
| ⊟ @LineMain | Service | Completed Successfully | 11-Sep-08 18:14:49 MDT |
| @client | Reference | Completed Successfully | 11-Sep-08 18:14:49 MDT |
| @OrchCRUDService | Reference | Completed Successfully | 11-Sep-08 18:14:50 MDT |
| @OrchCRUDService | Reference | Completed Successfully | 11-Sep-08 18:14:50 MDT |
| ⊟ ⨳ LineMain | BPEL Component | Completed Successfully | 11-Sep-08 18:14:52 MDT |
| @OrchCRUDService | Reference | Completed Successfully | 11-Sep-08 18:14:49 MDT |
| @OrchCRUDService | Reference | Completed Successfully | 11-Sep-08 18:14:50 MDT |

ANALYZING USER BEHAVIOR TO ENHANCE DATA DISPLAY

RELATED APPLICATION DATA

This application is related to U.S. patent application Ser. No. 12/415,440 entitled "Storing Hierarchical Data to Enable Paging," filed concurrently herewith, invented by Sanjay Krishnamurthy, the contents of which are herein incorporated by reference for all purposes as if fully set forth herein.

FIELD OF THE INVENTION

The present invention generally relates to enhancing the display of data based upon stored data describing user behavior.

BACKGROUND OF THE INVENTION

A three-tier architecture is an architecture in which the responsibilities for the user interface, the functional process logic ("business rules"), and the storage of data are divided between independent modules, which are often on separate platforms. Apart from the usual advantages of modular software with well defined interfaces, a three-tier architecture is intended to allow any of the three tiers to be upgraded or replaced independently as requirements or technology change.

The tiers of a three-tier architecture are typically named the presentation tier, the application tier, and the data tier. The presentation tier (or "top tier") is responsible for implementing the user interface that facilitates interactions with a user. For example, the presentation tier is responsible for displaying information to a user and receiving instructions from a user.

The application tier (or "middle tier") implements the functional process logic or business rules of an application. The middle tier may be multi-tiered itself (in which case the overall architecture is called an "n-tier architecture").

The data tier (or "bottom tier") is responsible for storing and retrieving data. For example, a data tier may be implemented using a database management system (DBMS) that comprises one or more database servers and one or more databases.

It is desirable for a three-tier architecture to process requests from a user as quickly as possible to minimize any delay experienced by the user. One approach for expediting the processing of user requests is to cache data in the application tier based on where the data is stored in the data tier. For example, if a particular user request requires the retrieval of a row of data from a database, then the entire data block in which the row of data resides may be retrieved from the database and stored in a cache of the application tier. This approach avoids the cost of retrieving data from the database in processing a subsequent request if the request may be processed using data from the cached data block in the application tier. Consequently, this approach works best when numerous requests may be processed using data stored in the same general location. However, this approach is not very useful when the physical location of data required to process a user request varies from request to request.

SUMMARY OF EMBODIMENTS OF THE INVENTION

Techniques are provided for enhancing the display of data based upon stored data describing user behavior. In an embodiment, user interaction data that describes the interactions of a plurality of users with a user interface component is stored. The user interaction data may be analyzed to identify patterns of prior use of the user interface component. Based on the identified patterns of prior use of the user interface component, the operation of a three-tier architecture may be adjusted to enable the three-tier architecture to process requests involving the user interface component more efficiently and in less time than prior approaches.

According to one embodiment, the stored user interaction data may be analyzed to determine whether a certain percentage of users interact with a user interface component in a manner requiring the visual appearance of the user interface component to be updated to depict additional data not previously depicted by the user interface component. Upon determining that the percentage of users that do interact with the user interface component in a manner requiring the visual appearance of the user interface component to be updated to depict additional data not previously depicted is greater than a threshold value, the additional data required to update the visual appearance of the user interface component may be retrieved from a storage medium and cached at a middle tier. In this way, the next time the middle tier receives a request involving the additional data, the request may be processed by the middle tier without having the incur the delay of retrieving the data from a storage medium, as the additional data is already stored in the middle tier.

According to another embodiment, rather than caching the additional data required to update the visual appearance of the user interface component in a location at or accessible to the middle tier, the additional data may be provided to a client displaying the user interface component prior to the client requesting the additional data. The additional data may be stored in a location at or accessible to the client so that when the client requires the additional data, the client need not incur the delay of contacting the middle tier to request the additional data, as it is already accessible by the client.

According to another embodiment, the stored user interaction data may be analyzed to determine an estimated workload for processing future interactions involving the user interface component. Thereafter, a particular size for a pool of resources used to process requests involving the user interface component may be determined based on the estimated workload. Subsequently, one or more resources (such as a thread or data structure used to store data retrieved from a storage medium) may be initialized to form a pool of initialized resources of the particular size determined using the estimated workload. In this way, initializing the resources used in the processing requests involving the user interface component may be performed prior to receipt of a request involving the interaction of the user interface component; advantageously, the user issuing the request need not experience the delay of initializing those resources, as the resources are initialized prior to the issuance of the request by the user.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 4 is an illustration of a client depicting a user interface component on a display according to an embodiment of the invention;

DETAILED DESCRIPTION OF THE INVENTION

A method and apparatus for enhancing the display of data based upon stored data describing user behavior is described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Architecture Overview

Figure 1:
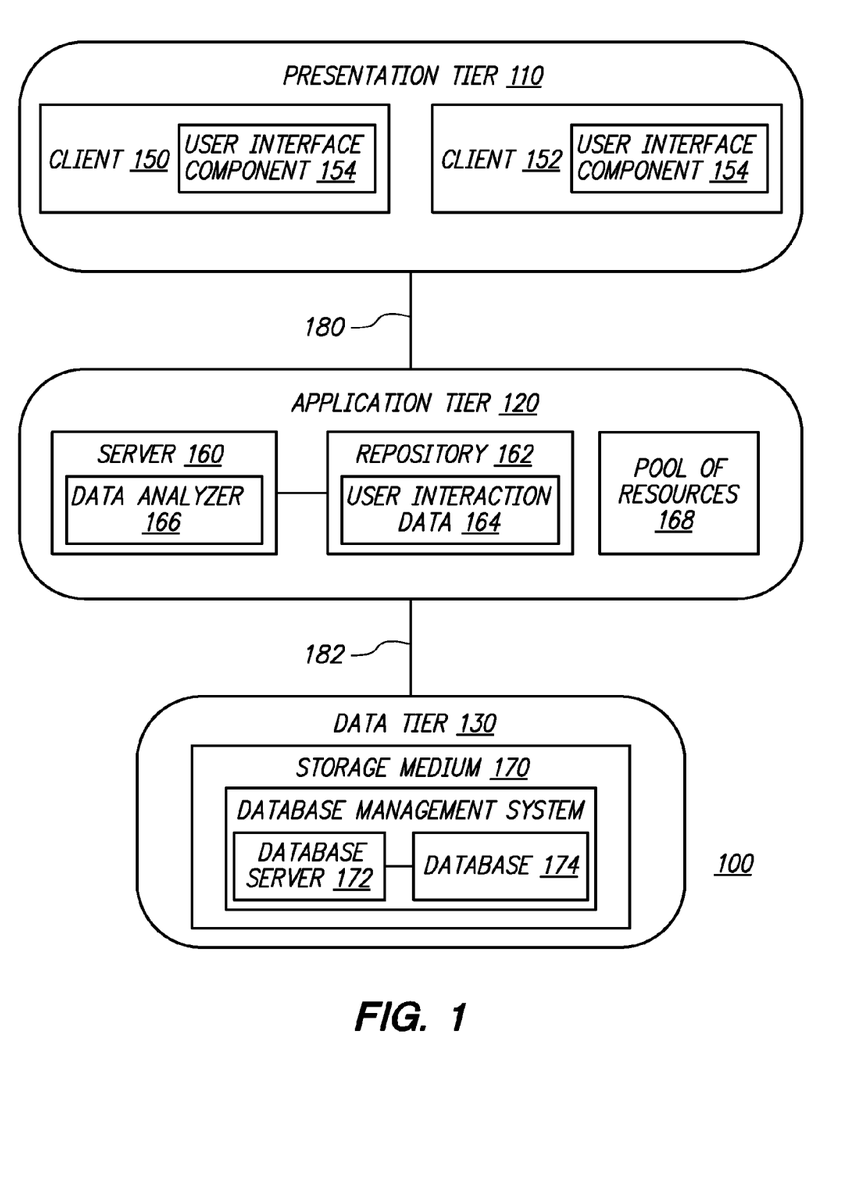
FIG. 1 block diagram of a system for enhancing data display according to an embodiment of the invention.

FIG. 1 is a block diagram of system 100 for enhancing data display according to an embodiment of the invention. System 100 may store user interaction data 164 that describes the interactions of a plurality of users with user interface component 154, analyze user interaction data 164, and subsequently adjust the operation of system 100 to improve the speed of processing user requests involving user interface component 154. In the embodiment depicted in FIG. 1, system 100 includes clients 150 and 152, server 160, repository 162, pool of resources 168, storage medium 170, and communication links 180 and 182.

In the embodiment of FIG. 1, system 100 is implemented using a three-tier architecture. As shown in FIG. 1, presentation tier (or "top tier") 110 includes clients 150 and 152, application tier (or "middle tier") 120 includes server 160, repository 162, and pool of resources 168, and data tier (or "bottom tier") 130 includes storage medium 170.

Clients 150 and 152, as broadly used herein, represent any hardware or software entity capable of presenting a user interface component, such as user interface component 154, to a user. Non-limiting, illustrative examples of clients 150 and 152 include a web browser, a cell phone, a personal digital assistance (PDA), a wireless device, or a software application. While only two clients are depicted in the embodiment shown in FIG. 1 for ease of explanation, other embodiments may employ any number of clients.

A user interface component, such as user interface component 154, is a graphical element that is capable of depicting data to a user. A user interface component may be incorporated as part of a display, such as a web page. Non-limiting illustrative examples of user interface component 154 include trees, tables, tree tables, or any other component that is capable of depicting data.

User interface component 154 may be capable of being configured by a user to display data in one or more states. For example, a user may configure user interface component 154 implemented as a tree to a different state by expanding or collapsing nodes of the tree or by performing a scrolling operation upon nodes of the tree.

User interface component 154 may be displayed on any number of clients at the same time. For example, if user interface component 154 is incorporated as part of a web page, then multiple web browsers may simultaneously depict user interface component 154. FIG. 1 illustrates an embodiment of system 100 where multiple clients, namely client 150 and 152, display user interface component 154 at the same time.

Server 160 may be implemented by any medium or mechanism that is capable of responding to requests issued by a client as well as storing data to and retrieving data from storage medium 170. While only one server is depicted in system 100, other embodiments of the invention may employ multiple servers. For example, for load balancing or to ensure operability, multiple instances of the same type of server may be employed by embodiments of the invention. As another example, embodiments of the invention may employ different types of servers that work in conjunction with one another, such as a web server and an application server and/or an authentication server. Thus, server 160 may be implemented by various embodiments using a single server, by using multiple servers of the same types, and/or multiple servers of different types.

Server 160 is capable of storing data to and retrieving data from repository 162. Repository 162 may be implemented by a variety of mediums for storing data. For example, repository 162 may be implemented as a cache or another form of volatile or non-volatile memory. In an embodiment, repository 162 may be implemented using OracleAS Metadata Repository (MDS) from Oracle Corporation of Redwood Shores, Calif.

Repository 162 may be, but need not be, implemented as part of server 160. For example, repository 162 is depicted as being separate from server 160; however, in other embodiments of the invention not depicted in FIG. 1, repository 162 may be implemented as part of server 160.

Repository 162 stores user interaction data 164. User interaction data 164 is data that describes the interactions of a plurality of users with user interface component 154. User interaction data 164 is used by system 100 to ascertain common behavior patterns of users of user interface component 154. As each user uses a client, such as client 150 or 152, to interact with user interface component 154, system 100 records user interaction data 164 describing how each user interacts with user interface component 154. To illustrate, if user interface component 154 is implemented as a tree, then user interaction data 164 may describe what nodes of the tree each user expands and collapses and how many nodes of the tree each user scrolls. As another example, if user interface component 154 is implemented as a spreadsheet, then user interaction data 164 may describe on which column(s) of the spreadsheet each user performs a sort operation and how many rows and/or columns each user scrolls. Thus, user interaction data 164 describes how each person configures, uses, manipulates, or instructs user interface component 154.

To further illustrate the scope of user interaction data 164, consider an example where user interface component 154 comprises two separate components, named component A and component B. In this example, component A is referred to as a master component, and component B is referred to as the detail component, because how a user interacts with component A affects what is displayed in (and consequently how a user may interact with) component B. Thus, the interactions a user has with component B heavily depend on the user's interaction with component A. User interaction data 164 may describe how a user interactions with component A as well as component B. For example, certain embodiments may employ user interaction data 164 that describes how a user interacts with component A, how the user's actions affect component B, and how the user interacts with component B.

As another example, user interface component 154 may comprise a tree table. A tree table is similar to a table in that tree tables are a collection of records, where each record comprises adjacent fields of data. However, in a tree table, one of the columns provides a visual depiction of the hierarchical relationship shared between records of the tree table. The visual depiction of the hierarchical relationship shared between records of the tree table may correspond to a tree of nodes. In effect, the appearance of one column of a tree table is that of a tree of nodes, with each node of the tree depicted in a different row of the tree table, thereby providing the viewer with information about the position of each row within a hierarchy represented by the tree of nodes. In an embodiment, user interaction data 164 describes any and all configurations or interactions a user has with the tree table. For example, if the user expands a node of the tree, views a set of newly displayed child nodes, and changes the values of one or more columns for one or more newly displayed child nodes, then user interaction data 164 may describe all these interactions with user interface component 154. In this way, user interaction data 164 may describe or illustrate how a certain user action impacts user interface component 154 and how a prior user interaction with user interface component 154 impacts a subsequent user interaction with user interface component 154. In an embodiment, user interaction data 164 may be continuously recorded and/or updated. As many users may be configuring, using, manipulating, or instructing user interface component 154 over the course of each day (assuming user interface component 154 is made accessible to users anytime), system 100 may continuously record or update user interaction data 164 as each and every user-initiated action to configure, use, manipulate, or instruct user interface component 154 is performed by any user. In other embodiments, user interaction data 164 may only be recorded and/or updated during certain specified or configurable time intervals or restricted in some other manner, such as by location or type of the client interacting with user interface component 154.

In certain embodiments, while the interactions of a user with user interface component 154 may be noted, recorded, or stored by client 150 or server 160 as they happen, user interaction data 164 need only be updated to reflect those interactions in a batch process or periodically. In this way, a user of client 150 need not be online when user interaction data 164 is updated to reflect his or her interactions with user interface component 154. Such an embodiment may be advantageous as it allows the load on computational resources of system 100 to be minimized while users of system 100 interact with user interface component 154. In this way, any potential performance impact of system 100 in updating user interaction data 164 may go unnoticed by users of system 100, since user interaction data 164 may be updated to reflect a plurality of user's interactions with user interface component 154 when those users are not online or otherwise interacting with system 100.

Data analyzer 166 may be implemented by any combination of hardware and software that is capable of analyzing data. Data analyzer 166 may be used by embodiments of the invention to analyze user interaction data 164 stored in repository 162. Data analyzer 166 may be used to analyze user interaction 164 to identify patterns of prior use of user interface component 154 by a plurality of users. While FIG. 1 depicts data analyzer 166 as being comprised within server 160, other embodiments may implement data analyzer 166 within application tier 120 but separate and distinct from server 160.

Storage medium 170 may be implemented by any medium or mechanism that is capable of storing digital data. In the embodiment depicted in FIG. 1, storage medium 170 is implementing using a database management system (DBMS) that comprises one or more database servers 172 and one or more databases 174. Other embodiments not depicted in FIG. 1 may implement storage medium 170 using a file server or other forms of volatile or non-volatile storage media.

Communications link 180 may be implemented by any medium or mechanism that provides for the exchange of data between a client and server 160. Communications link 182 may be implemented by any medium or mechanism that provides for the exchange of data between server 160 and storage medium 170. Non-limiting, illustrative examples of communications links 180 and 182 include, without limitation, a network such as a Local Area Network (LAN), Wide Area Network (WAN), Ethernet or the Internet, one or more terrestrial, satellite or wireless links, and serial or parallel printer cables.

Having described an illustrative system 100 according to an embodiment of the invention, the high-level functional steps performed by an embodiment of the invention shall now be discussed.

Functional Overview

Figure 2:
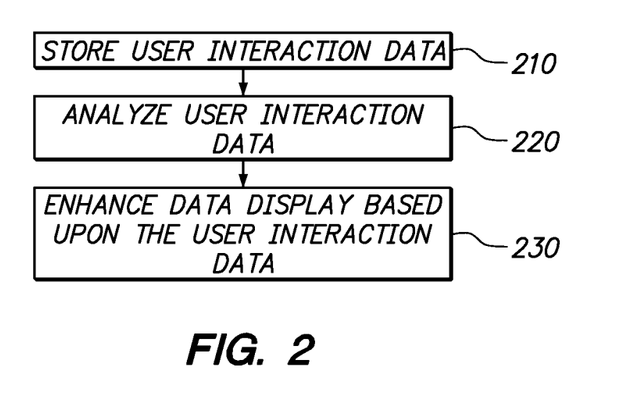
FIG. 2 is a flowchart of the high-level functional steps of an embodiment of the invention.

FIG. 2 is a flowchart of the high-level functional steps performed by an embodiment of the invention. By performing the steps illustrated in FIG. 2, embodiments of the invention may enhance a user's experience in interacting with user interface component 154 by reducing the response time of system 100 in responding to user's requests to interact with user interface component 154.

In step 210, user interaction data 164 is stored in repository 162. Embodiments of the invention may store user interaction data in a variety of different ways. According to one approach, when a user interacts with a user interface component, such as user interface component 154, using a client, such as client 150 or client 152, the client sends data describing how the user is interacting with user interface component 154 to server 160, and thereafter server 160, using the information received from the client, may store or update user interaction data 164 in repository 162. In other embodiments, client 150 may store or update user interaction data 164 in repository 162 without interaction with server 160. In yet other embodiments, server 160 may store user interaction data 164 in repository 162 without the involvement of a client. For example, server 160 may store or update user interaction data 164 based on the types of requests processed by server 160 that involve user interface component 154.

In an embodiment, as previously explained, while the interactions of a user with user interface component 154 may be noted, recorded, or stored by client 150 or server 160 as they happen, user interaction data 164 need only be updated to reflect those interactions in a batch process or periodically. In this way, any potential performance impact of system 100 in updating user interaction data 164 may go unnoticed by users of system 100, since user interaction data 164 may be updated to reflect a plurality of user's interactions with user interface component 154 when those users are not online or otherwise interacting with system 100. After user interaction data 164 is stored in repository 182, processing proceeds to step 220.

In step 220, user interaction data 164 is analyzed by data analyzer 166. Data analyzer 166 may be used to analyze user interaction 164 to identify patterns of prior use of user interface component 154 by a plurality of users.

By identifying how a plurality of users have interacted with user interface component 154, data analyzer 166 may identify how much additional data is typically displayed to a user in response to the user interacting with or manipulating user interface component 154. As shall be explained in more detail below, the amount of additional data that is typically displayed to a user may be cached at the middle tier or sent to a client prior to the client requesting the additional data.

Data analyzer 166 may perform various types of analysis on the user interaction data. For example, data analyzer 166 may generate statistics that describe the frequency of different methods of interacting with user interface component 154, the type or amount of data typically requested, and/or an estimation of the workload required for future requests involving user interface component 154.

In an embodiment, in performing step 220, data analyzer 166 may analyze user interaction data 164 while the user or users whose behavior is described by user interaction data 164 are offline. In this way, data analyzer 166 may analyze user interaction data 164 without requiring any interaction with any client, or any user of any client, in system 100. As a result, user interaction data 164 may be recorded in system 100 over a period of time, and data analyzer 166 may periodically analyze user interaction data 164 in the performance of step 220 independent of any action taken by any client or user of system 100. For example, data analyzer 166 may schedule the performance of step 220 during a time when relatively more computational resources of application tier 120 are available, such as when a relatively few number of clients in presentation tier 110 are interacting with application tier 120. After analyzing user interaction data 164, processing proceeds to step 230.

In step 230, system 100 enhances the display of data by user interface component 154 based upon the identified patterns of prior use described by user interaction data 164. Embodiments of the invention may perform step 230 using a variety of different approaches. Several approaches for performing step 230 shall be discussed below with reference to FIGS. 3-6. Having described the high-level functional steps of enhancing data display performed by an embodiment, a more detailed discussion of how particular embodiments enhance data display will now be presented.

Selectively Providing Data to a Client

Figure 3:
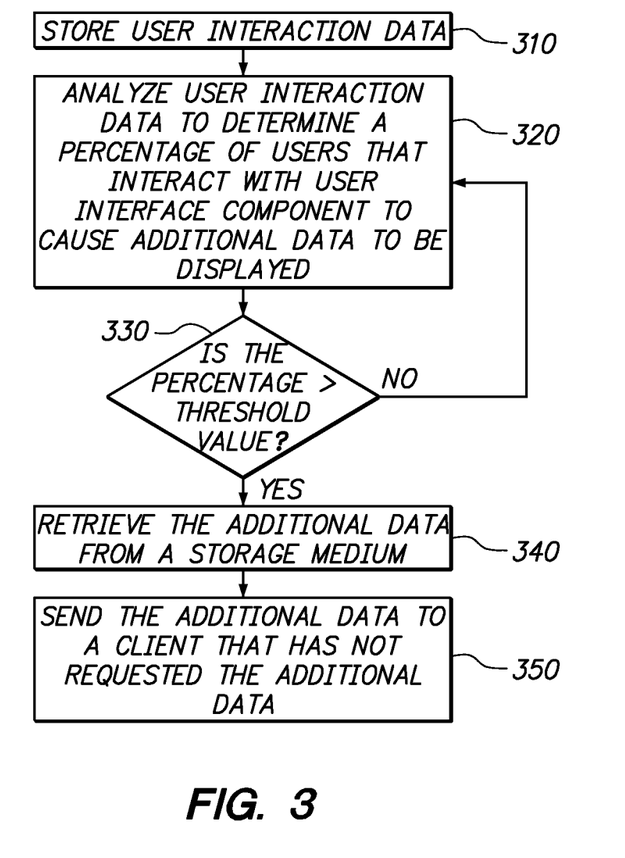
FIG. 3 is a flowchart of the functional steps of enhancing data display by selectively providing data to a client according to an embodiment of the invention.

FIG. 3 is a flowchart of the functional steps of enhancing data display by selectively providing data to a client according to an embodiment of the invention. By performing the steps illustrated by FIG. 3, system 100 may provide data to client 150 for possible display by user interface component 154 prior to client 150 issuing a request for the data. In this way, if a user does instruct user interface component 154, displayed by client 150, to depict at least a portion of the data, then client 150 is already in possession of the data to be displayed, and so the delay that would naturally result from retrieving the requested data may be avoided.

In step 310, user interaction data 164 is stored. The performance of step 310 may be performed similar to that discussed above with reference to step 210 of FIG. 2.

User interaction data 164 is data that describes the interactions of a plurality of users with user interface component 154. Each of the plurality of users interact with user interface component 154 using a client, such as client 150 or 152, upon which user interface component 154 is displayed. For example, client 152 may be implemented as a cell phone, and user interface component 154 may be implemented as a graphical element rendered on a screen of the cell phone. As another example, client 150 may be implemented as a web browser, and user interface component 154 may be implemented as a graphical element of a web page displayed by the web browser. An illustration of such an embodiment may be found in FIG. 4, which is an illustration 400 of a client 410 depicting a user interface component 420 on a display 430 according to an embodiment of the invention.

When a user interacts with user interface component 154, the user may cause user interface component 154 to display additional data not previously depicted by user interface component 154. As an example, assume that user interface component 154 is implemented using the expandable tree structure of user interface component 420 depicted in FIG. 4. In this example, user interaction data 164 may describe one or more user-initiated actions initiated by one or more users to expand or collapse one or more nodes, such as node 440, of the expandable tree structure of user interface component 420. When a node of a tree is expanded, one or more child nodes of the node being expanded are depicted, and when a node of a tree is collapsed, one or more child nodes of the node being collapsed cease to be displayed. In this way, a user may instruct user interface component 420 to expand a node of a tree to cause additional data not previously depicted to be displayed. User interaction data 164 may describe or identify the additional data which a user causes to be depicted by interacting with user interface component 154. For example, user interaction data 164 may describe or identify the additional data associated with one or more child nodes depicted by interface component 420 of FIG. 4 as a result of a user instructing user interface component 420 to expand node 440 to cause child nodes to be depicted by user interface component 420.

As another example, again assume that user interface component 154 is implemented using expandable tree structure of user interface component 420 of FIG. 4. In this example, user interaction data 164 may describe one or more user-initiated actions to scroll the expandable tree structure of user interface component 420 using scrollbar 450 to cause user interface component 420 to depict one or more additional nodes of the expandable tree structure. User interaction data 164 may describe or identify the additional data associated with the one or more additional nodes depicted by interface component 420 of FIG. 4 as a result of a user instructing user interface component 420 to scroll the nodes of the tree structure depicted by user interface component 420. After user interaction data 164 is stored, processing proceeds to step 320.

In step 320, user interaction data 164 is analyzed by data analyzer 166. In an embodiment, in step 320, data analyzer 166 determines a percentage of users that interact with user interface component 154 in a certain manner to cause user interface component 154 to depict additional data not previously depicted by user interface component 154. For example, if user interface component 154 is implemented as a tree structure, then the user-initiated actions of expanding a node of the tree or scrolling the tree cause user interface component 154 to depict additional data not previously depicted by user interface component 154.

In performing step 320, data analyzer 166 may analyze user interaction data 164 to identify the percent of users who interact with user interface component 154 in a plurality of different ways (up to and including all possible ways). After data analyzer 166 performs step 320, processing proceeds to step 330.

In step 330, a determination is made by data analyzer 166 as to whether the percentage determined in step 320 for a particular manner of interacting with user interface component 154 is greater than a threshold value. The threshold value may be a value that is stored by data analyzer 166 but is configurable by a human. The threshold value may be represented as a percentage, such as 60% or 80%. The threshold value represents the percent of users who must interact with user interface component 154 in a certain manner before system 100 performs one or more actions to optimize future user interactions with user interface component 154 based on the patterns of prior use of user interface component 154.

If the determination of step 330 is that the percentage of users who interacted with user interface component 154 in each manner considered is not greater than the threshold value, then processing proceeds back to step 320. In this way, data analyzer 166 may repeatedly analyze user interaction data 164 until the determination of step 330 is positive for at least one manner of interacting with user interface component 154. In an embodiment, if the determination of step 330 is negative, data analyzer 166 may wait a specified or configurable amount of time before performing step 320 again.

If the determination of step 330 is that the percentage of users who interacted with user interface component 154 in a particular manner is greater than the threshold value, then processing proceeds back to step 340.

In step 340, the additional data associated with the particular manner of interacting with user interface component 154 that exceeded the threaded value is retrieved from storage medium 170. The additional data retrieved in step 340 is the data that is required to update the display of user interface component 154 in accordance with the particular manner of interacting with user interface component 154 which exceeded the threshold value.

In an embodiment, server 160 may be responsible for retrieving the additional data from storage medium 170. After data analyzer 166 determines in step 330 that the percentage of users who interacted with user interface component 154 in a particular manner is greater than the threshold value, data analyzer 166 may notify server 160 that the percentage of users who interacted with user interface component 154 in the particular manner is greater than the threshold value. In response, server 160 may retrieve, from storage medium 170, the additional data associated with the particular manner in which a percentage of users greater than the threshold value interacted with user interface component 154.

As an example, if the percentage of users who interacted with user interface component 154 by expanding a particular node of a tree is greater than the threshold value, then in step 340 the additional data retrieved from storage medium 170 is the data required to depict the child nodes of the particular node being expanded. As another example, if the percentage of users who interacted with user interface component 154 by scrolling a certain number of nodes of tree is greater than the threshold value, then in step 340 the additional data retrieved from storage medium 170 is the data required to depict those nodes of the tree that are required to depict the scroll operation.

After the additional data associated with the particular manner of interacting with user interface component 154 that exceeded the threaded value is retrieved from storage medium 170, processing proceeds to step 350.

In step 350, the additional data retrieved in step 340 is sent from server 160 to one or more clients which are displaying or will display user interface component 154, but which has not yet requested the additional data. Thus, if client 150 and client 152 are displaying user interface component 154, but the user using each of client 150 and client 152 has not yet interacted with user interface component in the particular manner that was determined to exceed the threshold value in step 330, server 160 will transmit, to each of client 150 and 152, the additional data associated with the particular manner that was determined to exceed the threshold value in step 330. In this way, if the user of client 150 interacts with user interface component 154 in the particular manner that was determined to exceed the threshold value in step 330, client 150 will have the additional data necessary to update the display of user interface component 154 without having to incur the delay of waiting for server 160 to provide the data to client 150.

According to one embodiment, server 160 does not send the additional data to a client until the client has either requested, from server 160, a display that depicts user interface component 154 or is already displaying user interface component 154. In another embodiment, it is not necessary to wait for user interface component 154 to be displayed by a client before the additional data associated with a particular manner that was determined to exceed the threshold value in step 330 is sent to the client. In an embodiment, the additional data associated with a particular manner that was determined to exceed the threshold value in step 330 may be send to a client contemporaneous with the transmission of display data that describes, to the client, how to render user interface component 154. For example, if user interface component 154 is incorporated as part of a web page, then the additional data may be sent to the client at the same time as when the web page is transmitted to the client. The client may then cache the additional data so that if the additional data is needed, the client can access the additional data without waiting to retrieve the additional data from server 160.

In an embodiment, when a client, such as client 150, sends a request to server 160 for display data that describes how to render a particular display that includes user interface component 154, server 160 may adjust how user interface component 154 is depicted based on the patterns of prior use described by the user interaction data 164. To illustrate, assume that user interface component 154 may be displayed in a variety of possible configuration states. In an embodiment, server 160 may select, from the set of possible configuration states of user interface component 154, a particular configuration in which user interface component 154 should be displayed based on how users have interacted with user interface component 154 in the past. In this way, if a certain percentage of user configure user interface component 154 in a certain manner, then server 160 may subsequently analyze user interaction data 164 to determine how users interact with user interface component 154, and may thereafter, in response to receiving a request from a client for display data that describes how to render a particular display that includes user interface component 154, adjust the display data so that the user interface component 154 is depicted in accordance with how users have interacted with user interface component 154 in the past. For example, if a certain percentage of users turned a particular feature of user interface component 154 on or off or updated the display of user interface component 154 to depict a certain portion of data, then server 160 may, after analyzing user interaction data 164 to identify those patterns of prior use, subsequently adjust how server 160 responds to future requests for display data that describe how to render a display that includes user interface component 154 so that user interface component 154 is depicted in accordance with the identified patterns of use.

In an embodiment, after the performance of step 350, processing may proceed back to step 320. As user interaction data 164 may be continuously stored or updated, at a later point in time the percentage of users who interact with user interface component 154 in a particular manner may change, and consequently, at a later point in time the determination of step 330 may be positive where before it was negative. Consequently, certain embodiments of the invention iteratively perform the steps of FIG. 3.

Having described one approach for enhancing the display of data taken by embodiments of the invention by selectively providing data to a client based on patterns of use of a user interface component, another approach involving selectively caching data at an application tier shall now be discussed.

Selectively Caching Data at an Application Tier

Figure 5:
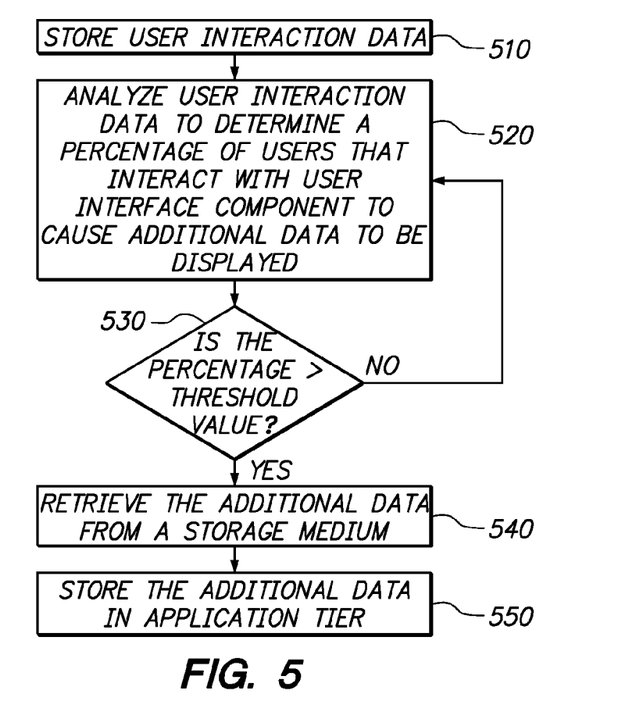
FIG. 5 is a flowchart of the functional steps of enhancing data display by selectively storing data in an application tier according to an embodiment of the invention.

FIG. 5 is a flowchart of the functional steps of enhancing data display by selectively storing data in application tier according to an embodiment of the invention. By performing the steps illustrated by FIG. 5, system 100 may store, at application tier 120, data required for server 160 to respond to popular ways of interacting with user interface component 154, prior to server 160 receiving a user request for the data. In this way, when server 160 receives a request from client 150 to update the display of user interface component 154 to depict the data, server 160 may respond to the request without having to retrieve the data from storage medium 170, thereby avoiding the delay that would naturally result from retrieving the requested data from storage medium 170.

The performance of steps 510, 520, 530, and 540 of FIG. 5 is substantially similar to the performance of the aforementioned steps 310, 320, 330, and 340 of FIG. 3. As depicted in FIG. 5, after the additional data associated with the particular manner of interacting with user interface component 154 that exceeded the threshold value is retrieved from storage medium 170, processing proceeds to step 550.

In step 550, the additional data retrieved in step 540 is stored in application tier 120. Embodiments may store the additional data in a variety of different locations within application tier 120, such as a location at or accessible to server 160 or repository 182 or in a cache in application tier 120. In an embodiment, server 160 may be the entity responsible for storing the additional data in step 550.

Advantageously, when server 160 receives a request from client 150 to update the display of user interface component 154 to depict at least a portion of the additional data stored in step 550, server 160 may respond to the request without having to retrieve the requested data from storage medium 170, and instead may respond to the request by retrieving the requested data from its storage location in application tier 120. As a result, the delay that would naturally result from server 160 retrieving the requested data from storage medium 170 may be avoided.

Embodiments of the invention may perform either the steps of FIG. 3 or the steps of FIG. 5. Other embodiments of the invention may perform both the steps of FIG. 3 and the steps of FIG. 5. For example, in an embodiment, it may be beneficial to store the additional data at application tier 120 and also send the additional data to a client that is or about to display user interface component 154. Such an embodiment may be beneficial when it is not possible or practical to ensure that additional data will be sent to each client in system 100 contemporaneous with the display of user interface component 154 on the client. Thus, if client 150 issues a request which may be satisfied using the additional data stored in application tier 120 prior to the receipt of the additional data by client 150, then server 160 may process the request without having to incur the cost of retrieving the requested data from storage medium 170.

In an embodiment, after the performance of step 550, processing may proceed back to step 520. As user interaction data 164 may be continuously stored or updated, at a later point in time the percentage of users who interact with user interface component 154 in a particular manner may change, and consequently, at a later point in time the determination of step 530 may be positive where before it was negative. Consequently, certain embodiments of the invention iteratively perform the steps of FIG. 5.

Having described an approach taken by embodiments of the invention for enhancing the display of data by selectively storing data in application tier 120, an approach involving selectively initializing resources at an application tier shall now be discussed.

Selectively Initializing Resources at an Application Tier

Figure 6:
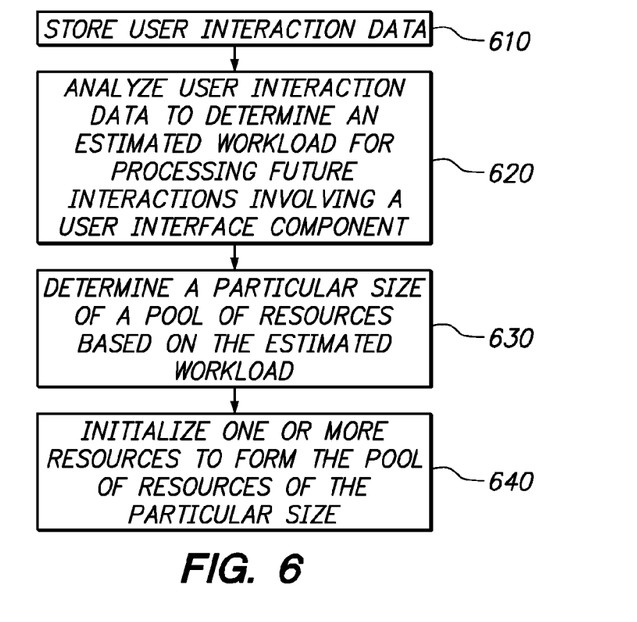
FIG. 6 is a flowchart of the functional steps of enhancing data display by selectively initializing resources within an application tier according to an embodiment of the invention.

FIG. 6 is a flowchart of the functional steps of enhancing data display by selectively initializing resources within application tier 120 according to an embodiment of the invention. By performing the steps illustrated in FIG. 6, system 100 may initialize an appropriate amount of resources, within application tier 120, to respond to an estimated future workload involving user interface component 154 based on a pattern of prior use, by a plurality of users, involving user interface component 154. In this way, when server 160 receives a request from client 150 involving user interface component 154, server 160 should not need to initialize any additional resources to respond to the request, as those resources should already have been initialized prior to the receipt of the request by server 160. Advantageously, a user issuing a request via client 150 may avoid the delay that would result if the resources, at application tier 120, required to process the request were not initialized until the request was received by server 160. Moreover, as the patterns of prior use of user interface component 154 were considered when determining the size of the pool of resources to initialize at application tier 120, it is likely that future requests involving user interface component 154 may be processed using available resources in the pool of resources that have already been initialized.

In step 610, user interaction data 164 is stored. The performance of step 610 may be performed similar to that discussed above with reference to step 310 of FIG. 3. After storing user interaction data 164, processing proceeds to step 620.

In step 620, user interaction data 164 is analyzed by data analyzer 166. In an embodiment, in step 620, data analyzer 166 analyzes user interaction data 164 to determine an estimated workload for processing future interactions with user interface component 154 based on the patterns of prior use of user interface component 154 described by user interaction data 164. After data analyzer 166 performs step 620, processing proceeds to step 630.

In step 630, data analyzer 166 determines a particular size of pool of resources 168, used by processing entities of application tier 120 to process requests involving user interface component 154, based on the estimated workload. Pool of resources 168 may be comprised of any resource in application tier 120 in which processing entities, such as server 160 or data analyzer 166, consume, use, or consult, in processing requests from clients which involve user interface component 154. Non-limiting, illustrative examples of such resources include threads which are capable of performing work on at least a portion of the estimated workload and data structures which are capable of storing a unit of data to be displayed in user interface component 154. The size of pool of resources 168 determined in step 630 is the estimated size in which pool of resources 168 will need to be so that there are available resources in pool of resources 168 for processing future requests involving user interface component 154. After the size of pool of resources 168 is determined, processing proceeds to step 640.

In step 640, one or more resources are initialized to form pool of resources 168 of the size determined in step 630. For example, one or more threads may be initialized or instantiated to form a pool of threads in step 640. As another example, one or more data structures, each capable of storing a unit of data to be displayed in user interface component 154, may be initialized or instantiated to form a pool of data structures in step 640.

Advantageously, when server 160 receives a request from client 150 involving user interface component 154, server 160 should not need to initialize any additional resources to respond to the request, as those resources should already have been initialized prior to the receipt of the request by server 160. Additionally, a user issuing a request via client 150 may avoid the delay that would result if the resources, at application tier 120, required to process the request were not initialized until the request was received by server 160. Moreover, as the patterns of prior use of user interface component 154 were considered when determining the size of pool of resources 168, it is likely that future requests involving user interface component 154 may be processed using available resources in pool of resources 168 that have already been initialized.

In an embodiment, after the performance of step 640, processing may proceed back to step 620. As user interaction data 164 may be continuously stored or updated, at a later point in time the estimated workload for processing future interactions involving user interface component 154 may change. Thus, an embodiment of the invention may periodically reanalyze user interaction data 164 to determine if the estimated workload should be revised. If the estimated workload is revised, then the size of pool of resources 168 may be accordingly adjusted.

Implementing Mechanisms

Figure 7:
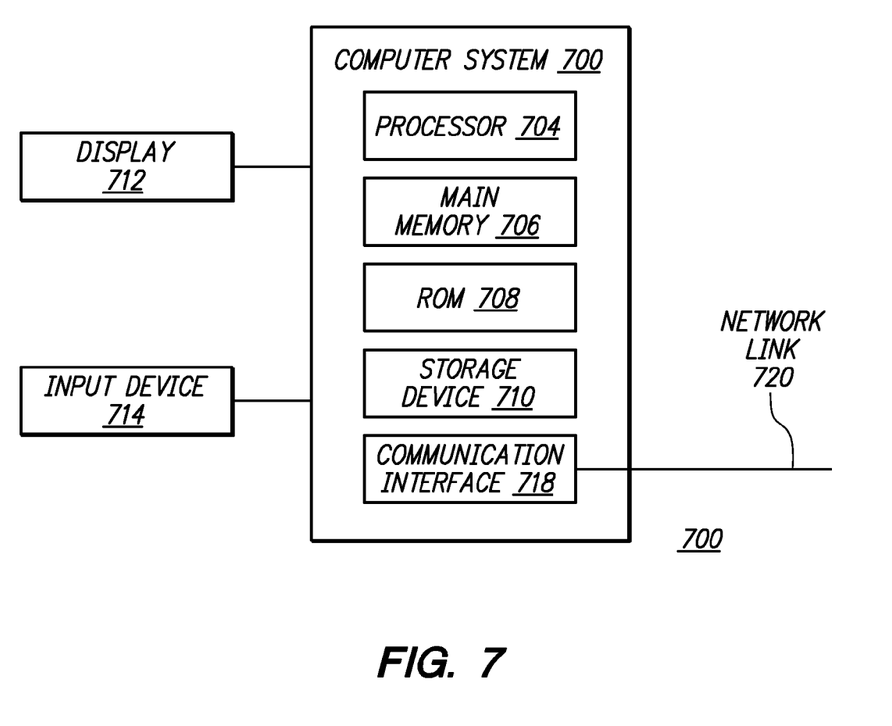
FIG. 7 is a block diagram of a computer system upon which an embodiment of the invention may be implemented.

In an embodiment, one or more of client 150, client 152, server 160, repository 162, pool of resources 168, and storage medium 170 may each be implemented on or using a computer system. FIG. 7 is a block diagram that illustrates a computer system 700 upon which an embodiment of the invention may be implemented. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Computer system 700 may be coupled to a display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, a light pen, a touch screen, or cursor direction keys for communicating direction information and command selections to processor 704 and for controlling cursor movement on display 712. While only one input device 714 is depicted in FIG. 7, embodiments of the invention may include any number of input devices 714 coupled to computer system 700.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for selectively providing data, the method comprising:
   analyzing user interaction data that describes interactions of users with a user interface component incorporated as part of a web page, the web page comprising a tree of data that can be user configured into a state selected from among a set of configuration states of the user interface component, to determine a percentage of users that interact with said user interface component in a particular manner to depict said tree of data in a second configuration state of the user interface component that requires a visual appearance of said user interface component to be updated to depict additional data of nodes of said tree of data not previously depicted in a first configuration state of the user interface component;
   determining whether said percentage of users that interact in the particular manner is greater than a threshold value, and responsive to said determining retrieving said additional data from a database via a database management system by use of at least one processor; and
   determining a particular size of a pool of resources based on an estimated workload, the estimated workload being determined based on patterns of prior use of the user interface component identified in the user interaction data, and forming said pool at least by instantiating one or more threads that are capable of performing work on at least a portion of the estimated workload.

2. The method of claim 1, wherein said analyzing said user interaction data comprises:
   identifying said additional data by analyzing patterns of use of said user interface component, wherein said patterns of use are described by said user interaction data.

3. The method of claim 1, wherein said user interaction data describes one or more user-initiated actions to expand a particular node previously depicted in said tree in the first configuration state of the user interface component, to depict said additional data of said nodes as one or more child nodes of said particular node.

4. The method of claim 1, wherein said user interaction data describes one or more user-initiated actions to scroll said tree on said particular display to cause said particular display to depict said additional data, and wherein said additional data is depicted in association with said nodes not previously depicted in the first configuration state.

5. A system to retrieve data required to render a display, the system comprising at least a processor coupled to a memory, and the system further comprising:
   means for analyzing user interaction data that describes interactions of users with a user interface component incorporated as part of a web page, the web page comprising a tree of data that can be user configured into a state selected from among a set of configuration states of the user interface component, to determine a percentage of users that interact with said user interface component in a particular manner that requires a visual appearance of said user interface component to be updated to depict additional data of nodes of said tree of data not previously depicted in a first configuration state of the user interface component;
   means for determining whether said percentage of users that interact in the particular manner is greater than a threshold value;
   means, responsive to said means for determining, for retrieving said additional data from a database via a database management system; and
   means for determining a particular size of a pool of resources based on an estimated workload, the estimated workload being determined based on patterns of prior use of the user interface component identified in the user interaction data, and for forming said pool at least by instantiating one or more threads that are capable of performing work on at least a portion of the estimated workload.

6. The system of claim 5, wherein said means for analyzing said user interaction data comprises:
   means for identifying said additional data by analyzing patterns of use of said user interface component, wherein said patterns of use are described by said user interaction data.

7. The system of claim 5, wherein said client comprises a web browser, and wherein said particular display comprises a web page.

8. The system of claim 5, wherein said user interaction data describes one or more user-initiated actions to expand a particular node previously depicted in said tree in the first configuration state of the user interface component, to depict said additional data of said nodes as one or more child nodes of said particular node.

9. One or more non-transitory machine-readable media storing one or more sequences of instructions for selectively providing data, which when executed by at least one processor perform:
   analyzing user interaction data that describes interactions of users with a user interface component incorporated as part of a web page, the web page comprising a tree of data that can be user configured into a state selected from among a set of configuration states of the user interface component, to determine a percentage of users that interact with said user interface component in a particular manner to depict said tree of data in a second configuration state of the user interface component that requires a visual appearance of said user interface component to be updated to depict additional data of nodes of said tree of data not previously depicted in a first configuration state of the user interface component;
   determining whether said percentage of users that interact in the particular manner is greater than a threshold value, and responsive to said determining retrieving said additional data from a database via a database management system; and determining a particular size of a pool of resources based on an estimated workload, the estimated workload being determined based on patterns of prior use of the user interface component identified in the user interaction data, and forming said pool at least by instantiating one or more threads that are capable of performing work on at least a portion of the estimated workload.

10. The one or more non-transitory machine-readable media of claim 9, wherein said analyzing said user interaction data comprises:

identifying said additional data by analyzing patterns of use of said user interface component, wherein said patterns of use are described by said user interaction data.

11. The one or more non-transitory machine-readable media of claim 9, wherein said user interaction data describes one or more user-initiated actions to expand a particular node previously depicted in said tree in the first configuration state of the user interface component, to depict said additional data of said nodes as one or more child nodes of said particular node.

12. The one or more non-transitory machine-readable media of claim 9, wherein said user interaction data describes one or more user-initiated actions to scroll said tree on said particular display to cause said particular display to depict said additional data, and wherein said additional data is depicted in association with said nodes not previously depicted in the first configuration state.

* * * * *